Dec. 31, 1946.     L. FRANKEL     2,413,443
CAMERA
Filed Sept. 18, 1944
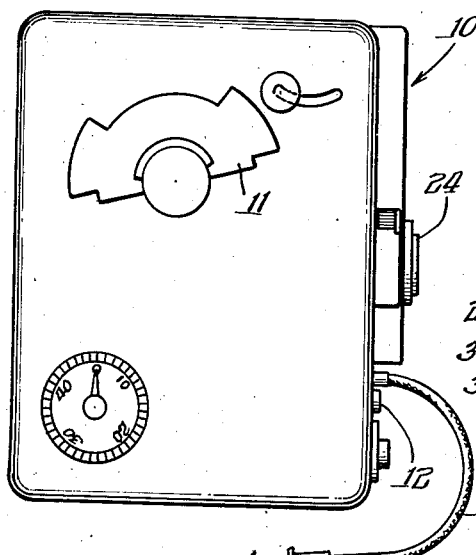
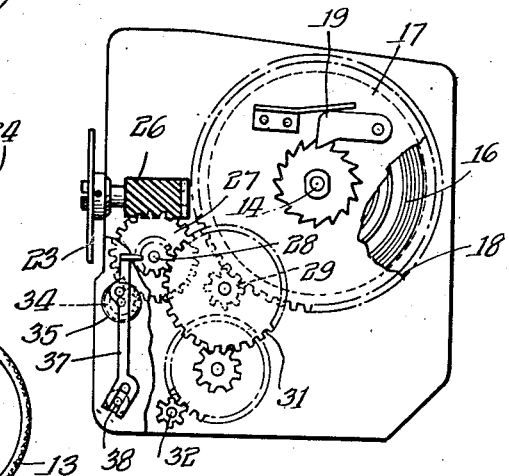
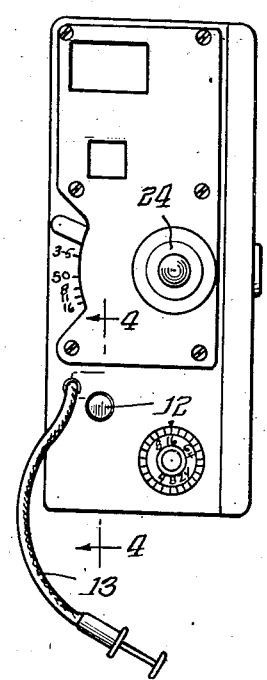
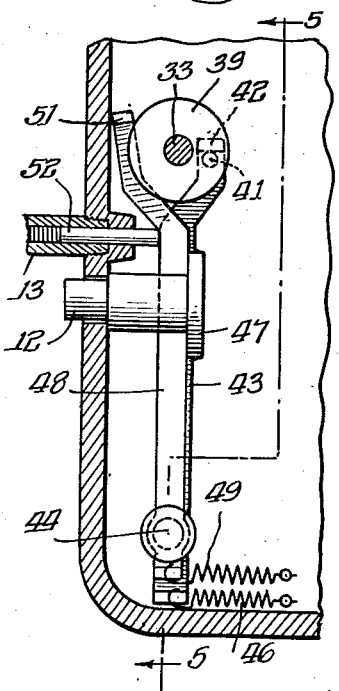
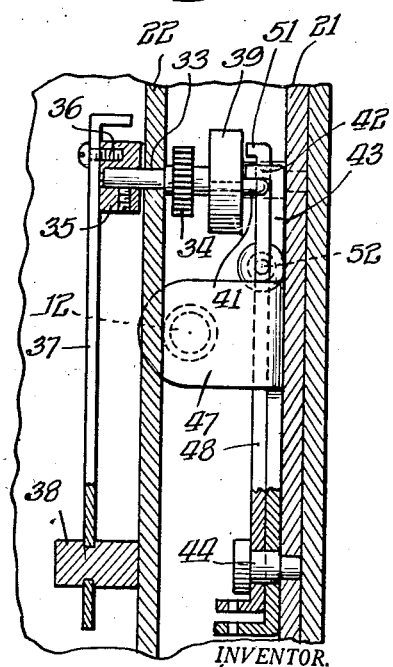
INVENTOR.
Leo Frankel
BY
McLaughlin & Wallenstein
Attys.

Patented Dec. 31, 1946

2,413,443

UNITED STATES PATENT OFFICE 2,413,443

CAMERA

Leo Frankel, Chicago, Ill.

Application September 18, 1944, Serial No. 554,572

4 Claims. (Cl. 88—17)

My invention relates to cameras and more in particular to a motion picture camera provided with simple, inexpensive means for taking a single picture.

In accordance with the general features of my invention, I utilize with a usual form of stop mechanism for controlling the operation of the shutter, a control mechanism for arresting the movement of the shutter at a position in which the light is not intercepted, said control mechanism being engageable exteriorly of the camera housing and functioning to arrest the operation of the shutter at light intercepting position when the control mechanism has performed its function. In a simple form of mechanism, such as shown in the drawing, the control mechanism operates as a "time exposure" mechanism although it may be operated in the general manner of a shutter mechanism in accordance with predetermined exposure time, if desired. The time exposure arrangement is advantageous in that it may be very inexpensively produced and is particularly advantageous for use by amateurs in the composing of titles and for other like purposes under conditions in which the light is not adequate for the usual exposure time allowed, in motion picture cameras.

My present invention is a continuation-in-part of my application, Serial No. 359,152, filed September 30, 1940, by me jointly with Ulrich R. Furst, now Patent No. 2,358,323, issued September 19, 1944.

In the drawing:

Fig. 1 is a side elevational view of a motion picture camera embodying the features of my invention;

Fig. 2 is a side elevational view (looking at the opposite side to Fig. 1) with the casing removed and one supporting plate removed and with parts broken away to show features of construction;

Fig. 3 is a front elevational view;

Fig. 4 is an enlarged fragmentary sectional view taken on the line 4—4 of Fig. 3, looking in the direction of the arrows; and Fig. 5 is a sectional view taken on the line 5—5 of Fig. 4 looking in the direction of the arrows.

The camera generally indicated by the reference character 10 may be of usual type intended for amateur use and as illustrated has a spring winding wing nut 11, a button 12 on the front face for controlling the operation in taking motion pictures (starting and stop button) and adapted to be provided with a cable release 13 for the taking of single pictures.

The wing nut 11 turns a shaft 14 connected to one end of a main spring 16, the opposite end of the spring 16 being connected to a spring case 17 having an external gear 18. A ratchet and pawl mechanism 19 is provided to permit winding of the spring but to prevent unwinding thereof except as it performs its driving function. The shaft 14 and remaining portions of the spring motor mechanism are mounted between a pair of plates 21 and 22. The construction of these plates and much of the mechanism of the camera is illustrated only in so far as is required to explain the features of my present invention. In particular, I have not shown full details of the film transporting mechanism, the lens system, and the like, but only so much of these parts of the camera as is necessary to an understanding of the present invention.

A suitable form of shutter 23 controls admission of light through a lens 24 and is driven by a bevel gear 26 which in turn is driven by a gear 27. Gear 27 is on a shaft 28 driven by a series of gears, including gears 29 and 31, through the external gear 18. A shaft 32 is also driven from the same gear system and this shaft is adapted to drive a governor mechanism (not shown but see Fig. 4 of the parent application) so that when the gears are free to turn the rotation of the shutter is controlled to alternately place the shutter in light intercepting position and non-intercepting position in a customary manner.

As in the conventional camera, the film is controlled so that movement thereof takes place in a series of steps when the shutter is at light intercepting position. I shall refer only briefly to this portion of the film transporting mechanism.

Disposed between the plates 21 and 22 is a shaft 33 carrying a gear 34 meshing with a gear of the shutter drive system. The shaft 33 also carries a disc 35 having an eccentric pin 36 to which is pivoted a claw 37, the lower end of which is provided with an oblique bifurcation engaging around a pin 38. The claw is provided with a film engaging set of fingers shaped and so positioned as to engage in the usual perforations along the edge of the film. The construction and operation of the claw, as shown, will result in one complete cycle of movement for each rotation of the gear 34. The movement of the claw and of the entire film transporting mechanism, as well as of the shutter, is controlled by controlling the rotation of shaft 33 to which the gear 34 is attached.

Shaft 33 also carries a disc 39 in which is eccentrically disposed a pin 41. Pin 41 is normally engaged by a stop 42 on an arm 43 when the camera is not being operated but is disengaged by the stop 42 when the camera is being operated in the taking of a picture. The arm 43 is pivoted to a stud 44 carried by the plate 21 and a spring 46 normally holds the arm 43 in the full line position shown in Fig. 4. A projection 47 from the arm 43, however, is disposed in line with the inner end of the pin comprising the button 12 so that when the button 12 is pressed, the arm 43 is forced to the broken line position of Fig. 4 and releases the stop 42 from the pin 41. This permits the shaft 33 to rotate and at each complete rotation, as previously mentioned, the film transporting mechanism would make one complete cycle as would also the shutter 23. The operation of this portion of the mechanism is, in other words, generally in accordance with usual procedures.

Pivoted to the same stud 44 as the arm 43 is a second arm 48 normally held in the position shown in Fig. 4 by a spring 49. This arm 48 has a stop 51 which is normally out of the path of the pin 41. The arm 48, however, is aligned with the cable 52 of the cable release 13 so that when this cable is pressed the arm 48 is moved to a position in which the stop 51 is in the path of the pin 41. The projection 47 of the arm 43, however, lies in the path of the arm 48 so that when the arm 48 is rotated about its pivot in a clockwise direction (looking at Fig. 4) it carries the arm 43 with it a sufficient distance to disengage the pin 41. The result, therefore, is that the pin 41 is disengaged by the stop 42 and is engaged by the stop 51 as the shaft 33 makes a 180 degree rotation. The parts are so synchronized that the rotation of shaft 33 is arrested at a point where the shutter is in non-intercepting position so far as the light is concerned and the lens system 24 will, therefore, cause exposure of the film, it being recalled that in the ordinary motion picture camera the film is not being transported by the claw mechanism during the time that the shutter is in non-intercepting position so far as the light is concerned. By releasing the cable the arms 43 and 48 are permitted to return to the full line positions shown in Fig. 4 so that the rotation of the shaft 33 is permitted to continue for another 180 degrees and the movement of the shutter will be arrested at light intercepting position. In the simple form of the invention shown, the exposure time is controlled by controlling the time that the cable release is engaged but, as previously mentioned, any one of several mechanisms for controlling the exposure time may be employed in combination with the features illustrated if desired.

What I claim as new and desire to protect by Letters Patent of the United States is:

1. In a motion picture camera having a shutter, lens system, and film transporting mechanism, drive means for said shutter and film transporting mechanism, a rotatable member driven by said drive mechanism having a projection spaced from the axis of rotation thereof, a pair of arms having a common pivot and each having a stop for said projection, spring means urging said arms in a normal position with the said stop of one said arm engaging said projection to hold said rotatable member with the shutter in light intercepting position, and the said remaining stop spaced from the first stop and disposed in a position out of the path of said projection, means exterior of the camera for moving only the arm carrying the first mentioned stop to release the said projection and permit operation to take motion pictures, and means for moving both of said arms to release the first mentioned stop and project the second stop into the path of said projection at non light intercepting position to expose a single picture, said means functioning when released to permit return of both arms to normal position.

2. In a motion picture camera having a shutter, lens system, and film transporting mechanism, drive means for said shutter and film transporting mechanism, a rotatable member driven by said drive mechanism having a projection spaced from the axis of rotation thereof, a pair of arms having a common pivot and each having a stop for said projection, spring means urging said arms in a normal position with the said stop of one said arm engaging said projection to hold said rotatable member with the shutter in light intercepting position, and the said remaining stop spaced from the first stop and disposed in a position out of the path of said projection, a projection out of the path of said projection, a projection from the first arm in the path of the second arm, and means exterior of the camera for moving either arm, one such arm functioning to release the said projection on the rotatable member to take motion pictures, and the second functioning to move both arms to expose a single picture and return the parts to a position of non-exposure when released.

3. In a motion picture camera having a shutter, lens system, and film transporting mechanism, drive means for said shutter and film transporting mechanism, a rotatable member driven by said drive mechanism having a projection spaced from the axis of rotation thereof, a pair of arms having a common pivot and each having a stop for said projection, spring means urging said arms in a normal position with the said stop of one said arm engaging said projection to hold said rotatable member with the shutter in light intercepting position, and the said remaining stop spaced from the first stop and disposed in a position out of the path of said projection, a projection from the first arm in the path of the second arm, means carried by the said arm projection and extending exteriorly of the camera to withdraw said stop to take motion pictures, and means for moving the second arm to projection intercepting position, said second arm thereby, through said arm projection, activating the first arm to release the camera drive mechanism, release of said last mentioned means functioning again to inactivate the mechanism when a single picture has been taken.

4. In a motion picture camera having a shutter, lens system, and film transporting mechanism, drive means for said shutter and film transporting mechanism, a rotatable member driven by said drive mechanism having a projection spaced from the axis of rotation thereof, a pair of arms having a common pivot and each having a stop for said projection, spring means urging said arms in a normal position with the said stop of one said arm engaging said projection to hold said rotatable member with the shutter in light intercepting position, and the said remaining stop spaced from the first stop and disposed in a position out of the path of said projection. a projection from the first arm in the path of the second arm, means carried by the said arm projection and extending exteriorly of the camera to withdraw said stop to take motion pictures, and means, including a cable release, for moving the second arm to projection intercepting position, said second arm thereby, through said arm projection, activating the first arm to release the camera drive mechanism, release of said last mentioned means functioning again to inactivate the mechanism when a single picture has been taken.

LEO FRANKEL.